(12) United States Patent
Xu

(10) Patent No.: US 9,215,369 B2
(45) Date of Patent: Dec. 15, 2015

(54) DATA ACQUISITION METHOD AND ELECTRONIC DEVICE

(71) Applicant: Lenovo (Beijing) Co., Ltd., Beijing (CN)

(72) Inventor: Zhimin Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/458,844

(22) Filed: Aug. 13, 2014

(65) Prior Publication Data

US 2015/0085152 A1 Mar. 26, 2015

(30) Foreign Application Priority Data

Sep. 26, 2013 (CN) .......................... 2013 1 0446791

(51) Int. Cl.
*H04N 5/225* (2006.01)
*H04N 5/232* (2006.01)

(52) U.S. Cl.
CPC .......... *H04N 5/23232* (2013.01); *H04N 5/2258* (2013.01)

(58) Field of Classification Search
CPC .......... H04N 5/23232; H04N 5/23245; H04N 5/343; H04N 5/2323; H04N 5/3415; H04N 3/1593; H04N 2013/0088; H04N 2013/0074
USPC ..................... 348/36–39, 222.1, 218.1, 220.1
See application file for complete search history.

(56) References Cited

U.S. PATENT DOCUMENTS

| | | | | |
|---|---|---|---|---|
| 2007/0081081 A1* | 4/2007 | Cheng | ................... | G06T 3/4038 348/218.1 |
| 2008/0316327 A1* | 12/2008 | Steinberg | ........... | G06K 9/00248 348/222.1 |
| 2010/0238327 A1* | 9/2010 | Griffith | ................ | H04N 5/2251 348/240.99 |
| 2012/0287329 A1* | 11/2012 | Yahata | ..................... | G06T 5/50 348/345 |
| 2015/0116526 A1* | 4/2015 | Meng | ..................... | H04N 9/097 348/218.1 |

* cited by examiner

*Primary Examiner* — Yogesh Aggarawal

(74) *Attorney, Agent, or Firm* — Harness, Dickey & Pierce, P.L.C.

(57) ABSTRACT

A data acquisition method and an electronic device are provided. The electronic device includes a first image capturing unit and a second image capturing unit. The first image capturing unit and the second image capturing unit utilize different imaging modes during image capturing. The method includes: acquiring first image data of a current scene captured by the first image capturing unit and second image data of the current scene captured by the second image capturing unit respectively, where the first image data includes first sub-image data and second sub-image data, the second image data includes third sub-image data, an image dimension of the third sub-image data is the same as the image dimension of the first sub-image data, and a resolution of the third sub-image data is higher than a resolution of the first sub-image data; and synthesizing the third sub-image data with the first sub-image data.

12 Claims, 5 Drawing Sheets

---

101 acquiring first image data of a current scene captured by the first image capturing unit and second image data of the current scene captured by the second image capturing unit respectively

102 synthesizing the third sub-image data with the first sub-image data of the first image data to obtain the first image data with the first sub-image data having a resolution equal to the resolution of the third sub-image data

DATA ACQUISITION METHOD AND ELECTRONIC DEVICE

CROSS REFERENCES OF RELATED APPLICATION

The present application claims the priority to Chinese Patent Application No. 201310446791.6, entitled "DATA ACQUISITION METHOD AND ELECTRONIC DEVICE", filed on Sep. 26, 2013 with the State Intellectual Property Office of People's Republic of China, which is incorporated herein by reference in its entirety.

FIELD OF THE TECHNOLOGY

The present application relates to the field of computer application, and particularly to a data acquisition method and an electronic device.

BACKGROUND

A light field is a set of light emitted from every point in every direction in a space. A light field camera refers to a camera with a microscope array of tens of thousands of micro lenses disposed between a main lens and a photo sensor. In a light field camera, after receiving rays coming from the main lens and before transmitting the rays to the photo sensor, each micro lens in the microscope array separates out focus rays and performs conversion on data of the rays to achieve digital record. Built-in software operates on "expanded light field" to trace a placement of each ray on imageries at different distances, and a subsequent focusing process such as "refocusing" i.e., to refocus on a shot scene at any depth, is performed by a computer to obtain a clearer photo.

During a shooting process of the light field camera, light field data captured is four-dimensional data, i.e., two-dimensional spatial data and two-dimensional angle data. Due to limited number of sensor units in the light field camera, the light field camera has to compromise on a resolution of spatial data to achieve a given resolution of angle data, therefore the resolution of the spatial data in light field data is low.

SUMMARY

A data acquisition method and an electronic device are provided in this application to solve a conventional technical problem of a low resolution for spatial data in light field data.

A data acquisition method is provided in the application. The data acquisition method may be applied to an electronic device, the electronic device includes a first image capturing unit and a second image capturing unit, the first image capturing unit and the second image capturing unit utilize different imaging modes during image capturing, the method includes:

acquiring first image data of a current scene captured by the first image capturing unit and second image data of the current scene captured by the second image capturing unit respectively, where the first image data includes first sub-image data and second sub-image data, image dimensions of the first sub-image data and the second sub-image data are different, the second image data includes third sub-image data, an image dimension of the third sub-image data is the same as the image dimension of the first sub-image data, and an image resolution of the third sub-image data is higher than an image resolution of the first sub-image data; and synthesizing the third sub-image data with the first sub-image data of the first image data to obtain the first image data with the first sub-image data having a resolution equal to the resolution of the third sub-image data.

Preferably, in the method, the synthesizing the third sub-image data with the first sub-image data of the first image data to obtain the first image data with the first sub-image data having the resolution equal to the resolution of the third sub-image data includes:

generating an image patch library based on the third sub-image data; where the image patch library includes a first image patch and a second image patch corresponding to each first image patch, a resolution of the first image patch is the same as the resolution of the third sub-image data, and a resolution of the second image patch is the same as the resolution of the first sub-image data;

performing interpolation operation and patch decomposition on the first sub-image data to obtain a third image patch for the first sub-image data, wherein each third image patch corresponds to one second image patch, and a resolution of the third image patch is the same as the resolution of the third sub-image data;

determining, for each third image patch, a corresponding first image patch in the image patch library; and substituting, in the first sub-image data of the first image data, the third image patch with the determined corresponding first image patch to obtain the first image data with the first sub-image data having the resolution equal to the resolution of the third sub-image data.

Preferably, in the method, the generating the image patch library according to the third sub-image data includes:

decomposing the third sub-image data into at least one first image patch by taking each pixel in the third sub-image data as a center;

performing downsampling on each first image patch to obtain a second image patch corresponding to the first image patch, wherein the resolution of the second image patch is the same as the resolution of the first sub-image data.

Preferably, in the method, the performing interpolation operation and patch decomposition on the first sub-image data to obtain the third image patch of the first sub-image data includes:

performing interpolation operation on the first sub-image data to obtain first sub-image data with a resolution equal to the resolution of the third sub-image data; and decomposing the first sub-image data obtained after the interpolation operation into at least one third image patch by taking each pixel in the third sub-image data as a center, wherein each third image patch corresponds to one second image patch of the third sub-image data according to relative positions.

Preferably, in the method, the first image capturing unit and the second image capturing unit are disposed at adjacent positions;

the acquiring first image data of the current scene captured by the first image capturing unit and the second image data of the current scene captured by the second image capturing unit respectively includes:

triggering the first image capturing unit to capture the first image data of the current scene, and simultaneously triggering the second image capturing unit to capture the second image data of the current scene; and acquiring the first image data captured by the first image capturing unit and the second image data captured by the second image capturing unit respectively.

Preferably, in the method, the acquiring first image data of a current scene captured by the first image capturing unit and the second image data of the current scene captured by the second image capturing unit respectively includes:

triggering the first image capturing unit to capture, at a preset position, the first image data of the current scene;

triggering the second image capturing unit to capture, at the preset position, the second image data of the current scene; and acquiring the first image data captured by the first image capturing unit and the second image data captured by the second image capturing unit respectively.

An electronic device is further provided in the application. The electronic device includes a first image capturing unit and a second image capturing unit, the first image capturing unit and the second image capturing unit utilize different imaging modes during image capturing, the electronic device further includes:

an image data acquisition unit, configured to acquire first image data of a current scene captured by the first image capturing unit and second image data of the current scene captured by the second image capturing unit respectively, where the first image data includes first sub-image data and second sub-image data, image dimensions of the first sub-image data and the second sub-image data are different, the second image data includes third sub-image data, an image dimension of the third sub-image data is the same as the image dimension of the first sub-image data, and an image resolution of the third sub-image data is higher than an image resolution of the first sub-image data; and an image data synthesizing unit, configured to synthesize the third sub-image data with the first sub-image data of the first image data to obtain the first image data with the first sub-image data having a resolution equal to the resolution of the third sub-image data.

Preferably, in the electronic device, the image data synthesizing unit includes:

a patch library generation sub-unit, configured to generate an image patch library based on the third sub-image data, where the image patch library includes a first image patch and a second image patch corresponding to the first image patch, a resolution of the first image patch is the same as the resolution of the third sub-image data, and a resolution of the second image patch is the same as the resolution of the first sub-image data;

a third patch generation sub-unit, configured to perform interpolation operation and patch decomposition on the first sub-image data to obtain a third image patch of the first sub-image data, where each third image patch corresponds to one second image patch, and a resolution of the third image patch is the same as the resolution of the third sub-image data;

a patch determination sub-unit, configured to determine, for each third image patch, a corresponding first image patch in the image patch library; and a patch substitution sub-unit, configured to substitute, in the first sub-image data of the first image data, the third image patch with the determined corresponding first image patch, to obtain the first image data with the first sub-image data having a resolution equal to the resolution of the third sub-image data.

Preferably, in the electronic device, the patch library generation sub-unit includes:

a first patch decomposition module, configured to decompose the third sub-image data into at least one first image patch by taking each pixel in the third sub-image data as a center; and a patch downsampling module, configured to perform downsampling on each first image patch to obtain a second image patch corresponding to the first image patch, where the resolution of the second image patch is the same as the resolution of the first sub-image data.

Preferably, in the electronic device, the third patch generation sub-unit includes:

an interpolation operation module, configured to perform interpolation operation on the first sub-image data to obtain first sub-image data with a resolution equal to the resolution of the third sub-image data; and a second patch decomposition module, configured to decompose the first sub-image data obtained after the interpolation operation into at least one third image patch by taking each pixel in the third sub-image data as a center, and each third image patch corresponds to one second image patch of the third sub-image data according to relative positions.

Preferably, in the electronic device, the first image capturing unit and the second image capturing unit are disposed at adjacent positions;

in this case, the image data acquisition unit includes:

a capturing triggering sub-unit, configured to trigger the first image capturing unit to capture first image data of the current scene, and simultaneously trigger the second image capturing unit to capture second image data of the current scene; and a first acquisition sub-unit, configured to acquire the first image data captured by the first image capturing unit and the second image data captured by the second image capturing unit respectively.

Preferably, in the electronic device, the image data acquisition unit includes:

a first triggering sub-unit, configured to trigger the first image capturing unit to capture at a preset position the first image data of the current scene; and a second triggering sub-unit, configured to trigger the second image capturing unit to capture at the preset position the second image data of the current scene; and a second acquisition sub-unit, configured to acquire the first image data captured by the first image capturing unit and the second image data captured by the second image capturing unit respectively.

It can be known from the foregoing solutions that a data acquisition method and an electronic device are provided in this application. The electronic device includes a first image capturing unit and a second image capturing unit. Imaging modes of the first image capturing unit and the second image capturing unit during image capturing are different. In the application, first image data of a current scene captured by the first image capturing unit and second image data of the current scene captured by the second image capturing unit are acquired respectively, where the first image data includes first sub-image data and second sub-image data, the second image data includes third sub-image data, image dimensions of the third sub-image data and the first sub-image data are the same, for example, the third sub-image data and the first sub-image data may both be spatial image data, and an image resolution of the third sub-image data is higher than an image resolution of the first sub-image data. By synthesizing the third sub-image data with the first sub-image data of the first image data to obtain the first image data with the first sub-image data having a resolution equal to the resolution of the third sub-image data, a purpose of improving the spatial resolution for the first sub-image data of the first image data is achieved in this embodiment. In the embodiment, by using a second image capturing unit with a higher resolution to capture second image data with a higher resolution with respect to a same scene of first image data, and further by synthesizing the third sub-image data with the first sub-image data of the first image data, the resolution of the first sub-image data of the first image data is rendered the same as the resolution of the third sub-image data, namely the second image data, and thus the resolution of the first sub-image data of the first image data, such as a spatial resolution, is improved.

BRIEF DESCRIPTION OF THE DRAWINGS

To better explain the technical solutions in the embodiments of the application, drawings used in description of the embodiments are described below briefly. Apparently, the drawings described below are merely a few embodiments of the application. For those skilled in the art, other drawings can be obtained according to these drawings without any creative work.

DETAILED DESCRIPTION OF THE EMBODIMENTS

Technical solutions of embodiments of the application are clearly and completely described below in conjunction with drawings in the embodiments of the application. Apparently, the described embodiments are merely a few instead of all embodiments of the application. Based on the embodiments of the application, any other embodiments obtained by those skilled in the art without creative work are within the scope of the application.

Figure 1:
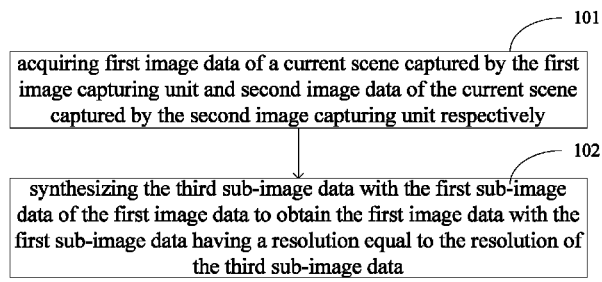
FIG. 1 is a flow chart of a data acquisition method according to a first embodiment of the application.

FIG. 1 is a flow chart of a data acquisition method provided according to a first embodiment of the application. The method can be applied to an electronic device. The electronic device may include a first image capturing unit and a second image capturing unit. Imaging modes of the first image capturing unit and the second image capturing unit during image capturing are different.

The first image capturing unit may be an image capturing device such as a light field camera. A microscope array of multiple micro lenses is placed between a main lens and a photo sensor of the light field camera, and the imaging mode of the light field camera is that: after receiving rays collected by the main lens and before transmitting the rays to the photo sensor, the microscope array separates out focus rays and performs conversion on data of the rays to achieve digital record and to obtain an "expanded light field", then traces a placement of each ray on imageries at different distances and obtains an image by refocusing digitally.

The second image capturing unit may be an image capturing device such as a conventional camera and the imaging mode of the second image capturing unit is: capturing rays by a main lens of the second image capturing unit, then focusing the rays on a film or a photo sensor, and obtaining an image with a collection of all the rays forming pixels on the photo.

In an embodiment of the application, the method may include following steps 101 and 102.

Step 101 includes: acquiring first image data of a current scene captured by the first image capturing unit and second image data of the current scene captured by the second image capturing unit respectively.

It is to be noted that the first image data and the second image data are image data of a same scene, i.e., the current scene faced by the electronic device.

The first image data indicates light field image data captured by the first image capturing unit with the foregoing light field image data imaging mode, and the second image data indicates ordinary image data captured by the second image capturing unit with the foregoing conventional image data imaging mode. The first image data may include first sub-image data and second sub-image data. Image dimensions of the first sub-image data and the second sub-image data are different, i.e., the first sub-image data may be 2-dimensional spatial image data, whereas the second sub-image data is 2-dimensional angular image data. The second image data includes third sub-image data. The third sub-image data has a same image dimension as the first sub-image data, and an image resolution of the third sub-image data is higher than an image resolution of the first sub-image data, i.e., if the first sub-image data is spatial image data, the third sub-image data is spatial image data and the spatial image resolution of the first sub-image data is lower than the spatial image resolution of the third sub-image data.

Step 102 includes: synthesizing the third sub-image data with the first sub-image data of the first image data to obtain the first image data with the first sub-image data having a resolution equal to the resolution of the third sub-image data.

In the step 102, because the first image data and the second image data are data of a same scene, the first sub-image data and the third sub-image data correspond to each other in terms of image positions, and process such as synthesizing of the third sub-image data with the first sub-image data of the first image data is performed according to the third sub-image data with a higher resolution to obtain the first image data with a changed resolution. In this case, the first sub-image data of the first image data has a resolution equal to the resolution of the third sub-image data, namely a higher resolution than the original resolution of the first sub-image data, and thus the resolution for the first sub-image data of the first image data is improved.

For example, the first image capturing unit is a light field camera and the light field camera captures light field image data of a current scene, and the second image capturing unit is an ordinary camera capturing ordinary image data of the current scene. To improve a resolution for spatial image data of the light field image data, in the embodiment, light field image data and ordinary image data are acquired, where the light field image data may include spatial image data and angular image data and the ordinary image data may include ordinary spatial image data with a resolution higher than the resolution of the spatial image data of the light field image data, and the ordinary spatial image data of the ordinary image data and the spatial image data of the light field image data are synthesized to achieve a purpose of the embodiment that the resolution for the spatial image data of the light field image data is adjusted to be the same as the resolution of the ordinary spatial image data.

It is noted that in the foregoing example, the embodiment is also applicable to improve a resolution for spatial image data of depth image data captured by a depth image capturing device such as Kinect.

It can be known from the foregoing solution that the data acquisition method provided according to the first embodiment of the application is applicable to an electronic device. The electronic device includes a first image capturing unit and a second image capturing unit. Imaging modes of the first image capturing unit and the second image capturing unit during image capturing are different. In the application, first image data of a current scene captured by the first image capturing unit and second image data of the current scene captured by the second image capturing unit are acquired respectively, where the first image data includes first sub-image data and second sub-image data, the second image data includes third sub-image data, image dimensions of the third sub-image data and the first sub-image data are the same, for example, the third sub-image data and the first sub-image data may both be spatial image data, and an image resolution of the third sub-image data is higher than an image resolution of the first sub-image data. By synthesizing the third sub-image data with the first sub-image data of the first image data to obtain the first image data with the first sub-image data having a resolution equal to the resolution of the third sub-image data, a purpose of improving the spatial resolution for the first sub-image data of the first image data is achieved in this embodiment. In the embodiment, by using a second image capturing unit with a higher resolution to capture second image data with a higher resolution with respect to a same scene of first image data, and further by synthesizing the third sub-image data with the first sub-image data of the first image data, the resolution of the first sub-image data of the first image data is rendered the same as the resolution of the third sub-image data, namely the second image data, and thus the resolution of the first sub-image data of the first image data, such as a spatial resolution, is improved.

Figure 2:
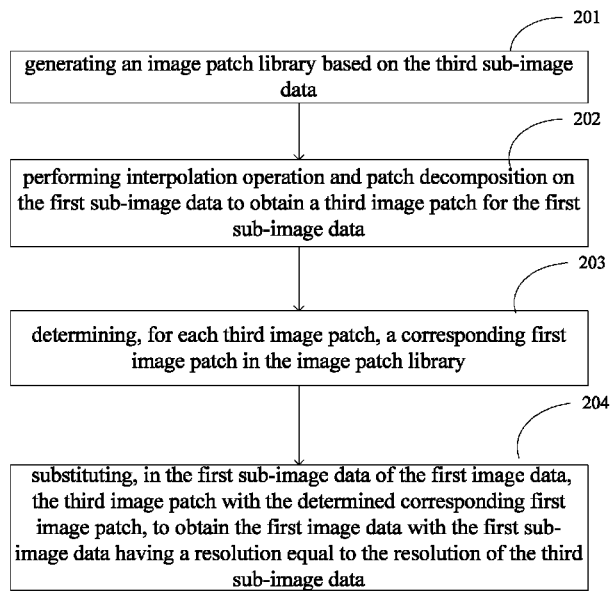
FIG. 2 is a partial flow chart of a data acquisition method according to a second embodiment of the application.

FIG. 2 is a flow chart of the step 102 in the data acquisition method provided according to the second embodiment of the application. The step 102 may includes steps 201-204.

Step 201 includes generating an image patch library based on the third sub-image data.

The image patch library includes a first image patch and a second image patch corresponding to the first image patch, a resolution of the first image patch is the same as the resolution of the third sub-image data, and a resolution of the second image patch is the same as the resolution of the first sub-image data.

Figure 3:
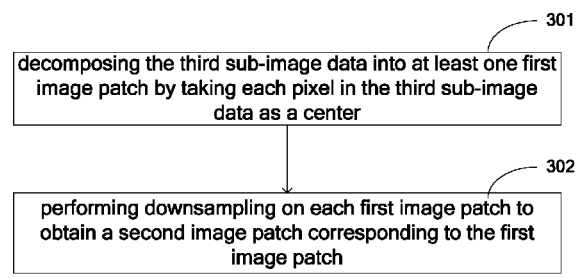
FIG. 3 is another partial flow chart of the second embodiment in the application.

FIG. 3 is a flow chart of an implementation of the step 201 in the second embodiment, and the step 201 may include following steps 301 and 302.

Step 301 includes decomposing the third sub-image data into at least one first image patch by taking each pixel in the third sub-image data as a center.

For example, the first image patch is a 5×5 pixel set, and in this case the step 301 includes: partitioning out a square having a length and a width represented by the same number of pixels (5 pixels) by taking each pixel in the third sub-image data as the center, where the pixel set covered by the square is a first image patch centered at the central pixel.

Step 302 includes performing downsampling on each first image patch to obtain a second image patch corresponding to the first image patch.

In step 302, the downsampling is performed on each first image patch according to the resolution of the first sub-image data, to obtain a second image patch corresponding to the first image patch. The number of pixels in each second image patch is less than the number of pixels in the corresponding first image patch, but the central pixels are the same. In this case, a resolution of the second image patch is the same as the resolution of the first sub-image data.

Step 202 includes performing interpolation operation and patch decomposition on the first sub-image data to obtain a third image patch for the first sub-image data.

Figure 4:
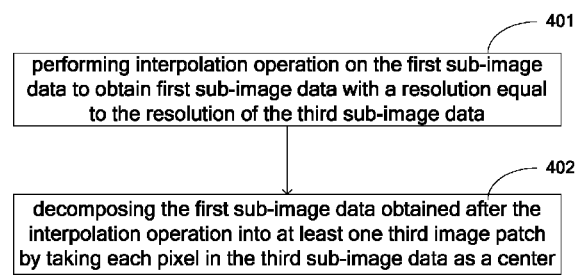
FIG. 4 is yet another partial flow chart of the second embodiment in the application.

FIG. 4 is a flow chart of an implementation of the step 202 in the second embodiment, and the step 201 may include following steps 401 and 402.

Step 401 includes performing interpolation operation on the first sub-image data to obtain first sub-image data with a resolution equal to the resolution of the third sub-image data.

The step 401 can be implemented in the following way:

performing interpolation operation on the first sub-image data by bilinear interpolation or cubic spline interpolation to obtain the first sub-image data with a resolution equal to the resolution of the third sub-image data.

It is noted that, after improving the resolution by interpolation operation, the first sub-image data, although having a resolution same as the resolution of the third sub-image data, has a definition lower than a definition of the third sub-image data.

Step 402 includes decomposing the first sub-image data obtained after the interpolation operation into at least one third image patch by taking each pixel in the third sub-image data as a center.

It can be known from previous description that each third image patch corresponds to one second image patch of the third sub-image data according to relative positions.

Step 203 includes determining, for each third image patch, a corresponding first image patch in the image patch library.

In the step 203, the first image patch corresponding to the third image patch can be determined in the image patch library by one to one comparison.

Step 204 includes substituting, in the first sub-image data of the first image data, the third image patch with the determined corresponding first image patch, to obtain the first image data with the first sub-image data having a resolution equal to the resolution of the third sub-image data.

In the step 204, it is meant to substitute the third image patch with a high resolution and a low definition with the first image patch with a high resolution and a high definition, to obtain the first image data with the first sub-image data having a high resolution and a low definition after the substitution, thus the purpose in the embodiment is achieved.

Figure 5:
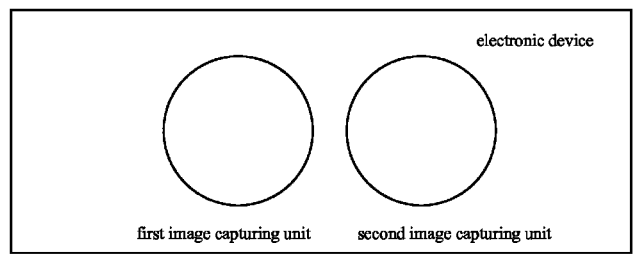
FIG. 5 is a diagram showing an application of a data acquisition method according to a third embodiment of the application.
Figure 6:
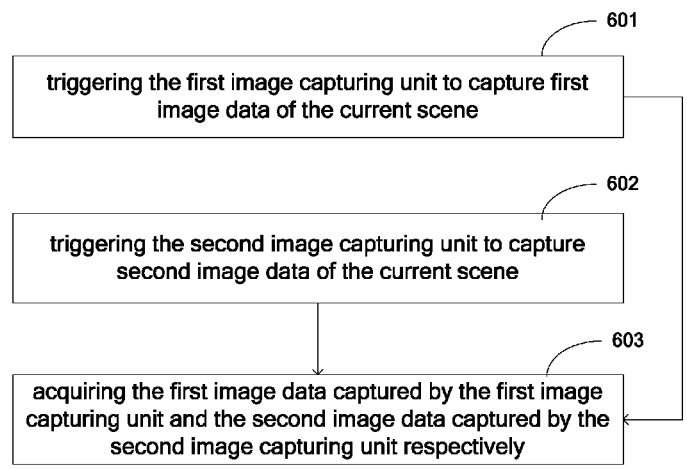
FIG. 6 is a partial flow chart of the data acquisition method according to the third embodiment of the application.

It is noted that in the electronic device, the first image capturing unit and the second image capturing unit may be in an adjacent arrangement, where the adjacent arrangement indicates that primary optical axes of the lens of the first image capturing unit and the second image capturing unit are parallel to each other and the distance between the first image capturing unit and the second image capturing unit is less than a certain value to ensure that the captured first image data and second image data correspond to each other in terms of positions, as shown in FIG. 5. FIG. 6 is a flow chart of the step 101 of the data acquisition method provided according to the third embodiment of the application, and the step 101 may include steps 601-603.

Step 601 includes triggering the first image capturing unit to capture first image data of the current scene.

Step 602 includes triggering the second image capturing unit to capture second image data of the current scene.

The step 601 and 602 are triggered simultaneously to ensure that the first image data and the second image data are image data of the current scene at a same moment.

Step 603 includes acquiring the first image data captured by the first image capturing unit and the second image data captured by the second image capturing unit respectively.

Figure 7:
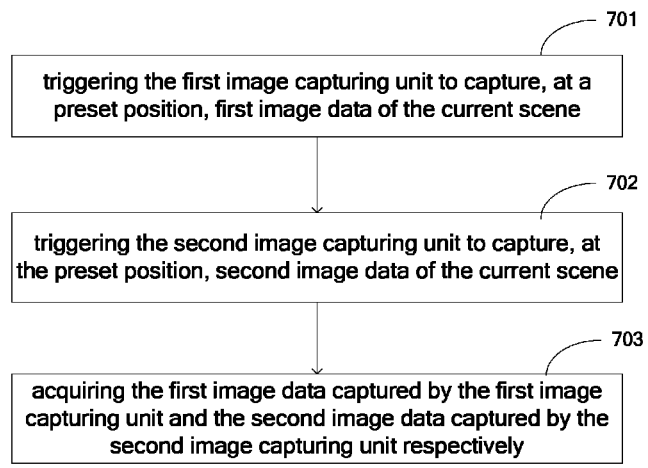
FIG. 7 is a partial flow chart of a data acquisition method according to a fourth embodiment of the application.

In addition, for a static scene, initial position of the first image capturing unit and the initial position of the second image capturing unit may not be limited, and each of the first image capturing unit and the second image capturing unit may be moved to a preset position when capturing images. FIG. 7 is a flow chart of the step 101 in the data acquisition method provided according to a fourth embodiment of the application. The step 101 may include steps 701-703.

Step 701 includes triggering the first image capturing unit to capture, at a preset position, first image data of the current scene.

Step 702 includes triggering the second image capturing unit to capture, at the preset position, second image data of the current scene.

It is noted that after the step 701 and before the step 702, the second image capturing unit needs to be moved to the preset position, and then in the step 702 the second image capturing unit is triggered to capture at the preset position the second image data, to ensure that the first image data and the second image data are image data of a same scene.

Step 703 includes acquiring the first image data captured by the first image capturing unit and the second image data captured by the second image capturing unit respectively.

Once the step 701 finishes, the step 702 can be triggered immediately, with a time interval between the two steps shorter than a certain value, to ensure that the first image data and the second image data are image data of the current scene at a same moment.

Figure 8:
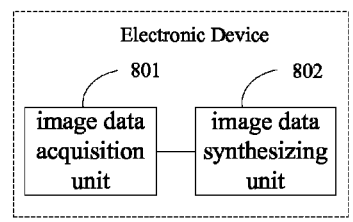
FIG. 8 is a structural diagram of an electronic device according to a fifth embodiment of the application.

FIG. 8 is a structural diagram of an electronic device provided according to a fifth embodiment of the application. The electronic device may include a first image capturing unit and a second image capturing unit. Imaging modes of the first image capturing unit and the second image capturing unit during image capturing are different.

The first image capturing unit may be an image capturing device such as a light field camera. A microscope array of multiple micro lenses is placed between a main lens and a photo sensor of the light field camera, and the imaging mode of the light field camera is that: after receiving rays collected by the main lens and before transmitting the rays to the photo sensor, the microscope array separates out focus rays and performs digital conversion on the rays to record in digital form and obtain an "expanded light field", then traces a placement of each ray on imageries at different distances and obtains an image by refocusing digitally.

The second image capturing unit may be an image capturing device such as a conventional camera and the imaging mode of the second image capturing unit is: capturing rays by a main lens of the second image capturing unit, and obtaining an image with a collection of all the rays forming pixels on the photo.

In the embodiment, the electronic device may include an image data acquisition unit 801 and an image data synthesizing unit 802.

The image data acquisition unit 801 is configured to acquire first image data of a current scene captured by the first image capturing unit and second image data of the current scene captured by the second image capturing unit respectively.

It is noted that the first image data and the second image data are image data of a same scene, i.e., the current scene faced by the electronic device.

The first image data indicates light field image data captured by the first image capturing unit with the foregoing light field image data imaging mode, and the second image data indicates ordinary image data captured by the second image capturing unit with the foregoing conventional image data imaging mode. The first image data may include first sub-image data and second sub-image data. Image dimensions of the first sub-image data and the second sub-image data are different, i.e., the first sub-image data may be 2-dimensional spatial image data, whereas the second sub-image data is 2-dimensional angular image data. The second image data includes third sub-image data. The third sub-image data has a same image dimension as the first sub-image data, and an image resolution of the third sub-image data is higher than an image resolution of the first sub-image data, i.e., if the first sub-image data is spatial image data, the third sub-image data is spatial image data and the spatial image resolution of the first sub-image data is lower than the spatial image resolution of the third sub-image data.

The image data synthesizing unit 802 is configured to synthesize the third sub-image data with the first sub-image data of the first image data to obtain the first image data with the first sub-image data having a resolution equal to the resolution of the third sub-image data.

In the image data synthesizing unit 802, because the first image data and the second image data are data of a same scene, the first sub-image data and the third sub-image data correspond to each other in terms of image positions, and process such as synthesizing of the third sub-image data with the first sub-image data of the first image data is performed according to the third sub-image data with a higher resolution to obtain the first image data with a changed resolution. In this case the first sub-image data of the first image data has a resolution equal to the resolution of the third sub-image data, namely a higher resolution than the original resolution of the first sub-image data, and thus the resolution for the first sub-image data of the first image data is improved.

For example, the first image capturing unit is a light field camera and the light field camera captures light field image data of a current scene, and the second image capturing unit is an ordinary camera capturing ordinary image data of the current scene. To improve a resolution for spatial image data of the light field image data, in the embodiment, light field image data and ordinary image data are acquired, where the light field image data may include spatial image data and angular image data and the ordinary image data may include ordinary spatial image data with a resolution higher than the resolution of the spatial image data of the light field image data, and the ordinary spatial image data of the ordinary image data and the spatial image data of the light field image data are synthesized to achieve a purpose of the embodiment that the resolution for the spatial image data of the light field image data is adjusted to be the same as the resolution of the ordinary spatial image data.

It is noted that in the foregoing example, the embodiment is also applicable to improve a resolution of spatial image data of depth image data captured by a depth image capturing device such as Kinect.

It can be known from the foregoing solution that an electronic device is provided according to the fifth embodiment of the application, the electronic device includes a first image capturing unit and a second image capturing unit. Imaging modes of the first image capturing unit and the second image capturing unit during image capturing are different. In the application, first image data of a current scene captured by the first image capturing unit and second image data of the current scene captured by the second image capturing unit are acquired respectively, where the first image data includes first sub-image data and second sub-image data, the second image data includes third sub-image data, image dimensions of the third sub-image data and the first sub-image data are the same, for example, the third sub-image data and the first sub-image data may both be spatial image data, and an image resolution of the third sub-image data is higher than an image resolution of the first sub-image data. By synthesizing the third sub-image data with the first sub-image data of the first image data to obtain the first image data with the first sub-image data having a resolution equal to the resolution of the third sub-image data, a purpose of improving the spatial resolution for the first sub-image data of the first image data is achieved in this embodiment. In the embodiment, by using a second image capturing unit with a higher resolution to capture second image data with a higher resolution with respect to a same scene of first image data, and further by synthesizing the third sub-image data with the first sub-image data of the first image data, the resolution of the first sub-image data of the first image data is rendered the same as the resolution of the third sub-image data, namely the second image data, and thus the resolution of the first sub-image data of the first image data, such as a spatial resolution, is improved.

Figure 9:
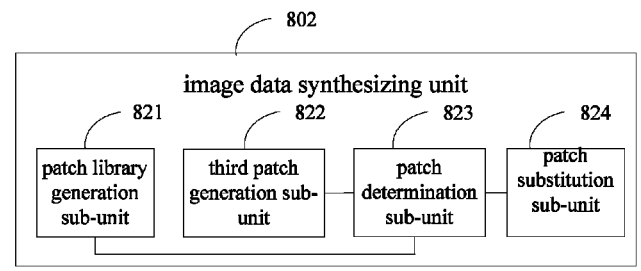
FIG. 9 is a partial structural diagram of an electronic device according to a sixth embodiment of the application.

FIG. 9 is a structural diagram of the image data synthesizing unit 802 in an electronic device provided according to a sixth embodiment of the application. The image data synthesizing unit 802 may include a patch library generation sub-unit 821, a third patch generation sub-unit 822, a patch determination sub-unit 823 and a patch substitution sub-unit 824.

The patch library generation sub-unit 821 is configured to generate an image patch library based on the third sub-image data.

The image patch library includes a first image patch and a second image patch corresponding to the first image patch, a resolution of the first image patch is the same as the resolution of the third sub-image data, and a resolution of the second image patch is the same as the resolution of the first sub-image data.

Figure 10:
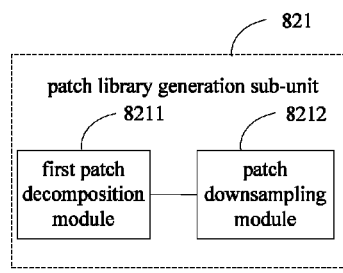
FIG. 10 is a partial structural diagram of the sixth embodiment in the application.

FIG. 10 is a structural diagram of the patch library generation sub-unit 821 in the sixth embodiment according to the application. The patch library generation sub-unit 821 may include a first patch decomposition module 8211 and a patch downsampling module 8212.

The first patch decomposition module 8211 is configured to decompose the third sub-image data into at least one first image patch by taking each pixel in the third sub-image data as a center.

For example, the first image patch is a 5×5 pixel set, and in this case the first patch decomposition module 8211 can be understood as: partitioning out a square having a length and a width represented by the same number of pixels (5 pixels) by taking each pixel in the third sub-image data as a center, where the pixel set covered by the square is a first image patch centered at the central pixel.

The patch downsampling module 8212 is configured to perform downsampling on each first image patch to obtain a second image patch corresponding to the first image patch.

The patch downsampling module 8212 performs downsampling on each first image patch according to the resolution of the first sub-image data, to obtain a second image patch corresponding to the first image patch. The number of pixels in each second image patch is less than the number of pixels in the corresponding first image patch, but the central pixels are the same. In this case, a resolution of the second image patch is the same as the resolution of the first sub-image data.

The third patch generation sub-unit 822 is configured to perform interpolation operation and patch decomposition on the first sub-image data to obtain a third image patche for the first sub-image data.

Figure 11:
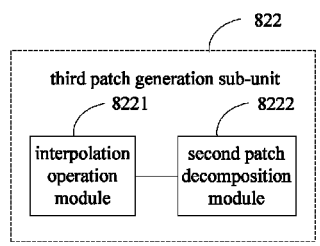
FIG. 11 is another structural diagram of the sixth embodiment in the application.

FIG. 11 is a structural diagram of the third patch generation sub-unit 822 in the sixth embodiment according to the application. The third patch generation sub-unit 822 may include an interpolation operation module 8221 and a second patch decomposition module 8222.

The interpolation operation module 8221 is configured to perform interpolation operation on the first sub-image data to obtain first sub-image data with a resolution equal to the resolution of the third sub-image data.

The interpolation operation module 8221 is configured to perform interpolation operation on the first sub-image data by bilinear interpolation or cubic spline interpolation to obtain the first sub-image data with a resolution equal to the resolution of the third sub-image data.

It is noted that, after improving the resolution by interpolation operation, the first sub-image data, although having a resolution same as the resolution of the third sub-image data, has a definition lower than a definition of the third sub-image data.

The second patch decomposition module 8222 is configured to decompose the first sub-image data obtained after the interpolation operation into at least one third image patch by taking each pixel in the third sub-image data as a center.

It can be known from previous description that each third image patch corresponds to one second image patch of the third sub-image data according to relative positions.

The patch determination sub-unit 823 is configured to determine, for each third image patch, a corresponding first image patch in the image patch library.

The patch determination sub-unit 823 may determine in the image patch library the first image patch corresponding to the third image patch by one to one comparison.

The patch substitution sub-unit 824 is configured to substitute, in the first sub-image data of the first image data, the third image patch with the determined corresponding first image patch, to obtain the first image data with the first sub-image data having a resolution equal to the resolution of the third sub-image data.

The patch substitution sub-unit 824 substitutes the third image patch with a high resolution and a low definition with the first image patch with a high resolution and a high definition, to obtain the first image data with the first sub-image data having a high resolution and a low definition after the substitution, thus the purpose in the embodiment is achieved.

Figure 12:
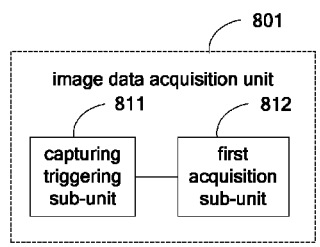
FIG. 12 is a partial structural diagram of an electronic device according to a seventh embodiment of the application.

It is noted that in the electronic device, the first image capturing unit and the second image capturing unit may be in an adjacent arrangement, where the adjacent arrangement indicates that primary optical axes of the lens of the first image capturing unit and the second image capturing unit are parallel to each other and the distance between the first image capturing unit and the second image capturing unit is less than a certain value to ensure that the captured first image data and second image data correspond to each other in terms of positions, as shown in FIG. 5. FIG. 12 is a structural diagram of the image data acquisition unit 801 in an electronic device provided according to a seventh embodiment of the application. The image data acquisition unit 801 may include a capturing triggering sub-unit 811 and a first acquisition sub-unit 812.

The capturing triggering sub-unit 811 is configured to trigger the first image capturing unit to capture first image data of the current scene, and simultaneously trigger the second image capturing unit to capture second image data of the current scene.

The capturing triggering sub-unit 811 triggers the first image capturing unit and the second image capturing unit simultaneously to ensure that the first image data and the second image data are image data of the current scene at a same moment.

The first acquisition sub-unit 812 is configured to acquire the first image data captured by the first image capturing unit and the second image data captured by the second image capturing unit respectively.

Figure 13:
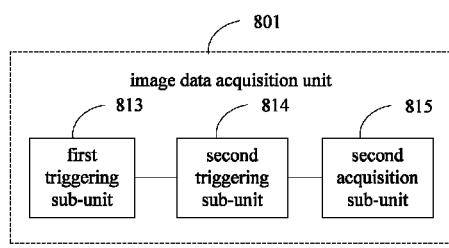
FIG. 13 is a partial structural diagram of an electronic device according to an eighth embodiment of the application.

In addition, for a static scene, initial positions of the first image capturing unit and the initial position of the second image capturing unit may not to be limited, and each of the first image capturing unit and the second image capturing unit may be moved to a preset position when capturing images. FIG. 13 is a structural diagram of the image data acquisition unit 801 in an electronic device provided according to the an eighth embodiment of the application. The image data acquisition unit 801 may include a first triggering sub-unit 813, a second triggering sub-unit 814 and a second acquisition sub-unit 815.

The first triggering sub-unit 813 is configured to trigger the first image capturing unit to capture, at a preset position, first image data of the current scene.

The second triggering sub-unit 814 is configured to trigger the second image capturing unit to capture, at the preset position, second image data of the current scene.

It is noted that after the first triggering sub-unit 813 finishes operation and before the second triggering sub-unit 814 operates, the second image capturing unit needs to be moved to the preset position, and then the second triggering sub-unit 814 triggers the second image capturing unit to capture at the preset position the second image data of the current scene, to ensure that the first image data and the second image data are image data of a same scene.

The second acquisition sub-unit 815 is configured to acquire the first image data captured by the first image capturing unit and the second image data captured by the second image capturing unit respectively.

Once the first triggering sub-unit 813 finishes operation, the second triggering sub-unit 814 may immediately trigger the second image capturing unit to capture data, with a time interval between the operation of the two sub-units shorter than a certain value, to ensure that the first image data and the second image data are image data of the current scene at a same moment.

It is noted that the embodiments in the application are described in a progressive manner. The description of each embodiment focuses on the differences from other embodiments, and description of similar parts of various embodiments can be found by mutual reference.

Finally, it is further noted that relational terms such as the first, the second, or the like is only used to distinguish one entity or operation from another, but not to necessitate or imply any actual relationship or order between the entities or operations as such. Moreover, the terms "include", "comprise", or any other variations thereof, are intended to be exclusive, so that the process, method, article or device that includes a series of elements includes not only those elements, but also other elements not explicitly enumerated, or also includes other elements inherent for the process, method, article or device. Unless expressively limited otherwise, the statement "comprising (including) one . . . " does not exclude the existence of additional similar elements in the process, method, article, or device including the element.

The data acquisition method and the electronic device are described above in detail. Specific examples are set forth to specify the principle and implementation of the disclosure, and the description of the foregoing embodiments is only intended to facilitate understanding the method and core principle of the disclosure. In addition, various modifications to implementations and applications of the embodiments may be made by those skilled in the art based on the spirit of the disclosure. Therefore, the disclosure is not meant to be limited to the specification.

The invention claimed is:

1. A data acquisition method, wherein the data acquisition method is applicable to an electronic device, the electronic device comprises a first image capturing unit and a second image capturing unit, the first image capturing unit and the second image capturing unit utilize different imaging modes during image capturing, the method comprises:

acquiring first image data of a current scene captured by the first image capturing unit and second image data of the current scene captured by the second image capturing unit respectively, wherein the first image data comprises first sub-image data and second sub-image data, image dimensions of the first sub-image data and the second sub-image data are different, the second image data comprises third sub-image data, an image dimension of the third sub-image data is the same as the image dimension of the first sub-image data, and an image resolution of the third sub-image data is higher than an image resolution of the first sub-image data; and synthesizing the third sub-image data with the first sub-image data of the first image data to obtain the first image data with the first sub-image data having a resolution equal to the resolution of the third sub-image data.

2. The method according to claim 1, wherein the synthesizing the third sub-image data with the first sub-image data of the first image data to obtain the first image data with the first sub-image data having the resolution equal to the resolution of the third sub-image data comprises:

generating an image patch library based on the third sub-image data, wherein the image patch library comprises a first image patch and a second image patch each corresponding to the first image patch, a resolution of the first image patch is the same as the resolution of the third sub-image data, and a resolution of the second image patch is the same as the resolution of the first sub-image data;

performing interpolation operation and patch decomposition on the first sub-image data to obtain a third image patch for the first sub-image data, wherein each third image patch corresponds to one second image patch, and a resolution of the third image patch is the same as the resolution of the third sub-image data;

determining, for each third image patch, a corresponding first image patch in the image patch library; and substituting, in the first sub-image data of the first image data, the third image patch with the determined corresponding first image patch to obtain the first image data with the first sub-image data having the resolution equal to the resolution of the third sub-image data.

3. The method according to claim 2, wherein the generating the image patch library based on the third sub-image data comprises:

decomposing the third sub-image data into at least one first image patch by taking each pixel in the third sub-image data as a center; and performing downsampling on each first image patch to obtain a second image patch corresponding to the first image patch, wherein the resolution of the second image patch is the same as the resolution of the first sub-image data.

4. The method according to claim 2, wherein the performing interpolation operation and patch decomposition on the first sub-image data to obtain the third image patch of the first sub-image data comprises:
performing interpolation operation on the first sub-image data to obtain first sub-image data with a resolution equal to the resolution of the third sub-image data; and
decomposing the first sub-image data obtained after the interpolation operation into at least one third image patch by taking each pixel in the third sub-image data as a center, wherein each third image patch corresponds to one second image patch of the third sub-image data according to relative positions.

5. The method according to claim 1, wherein the first image capturing unit and the second image capturing unit are disposed at adjacent positions;
the acquiring first image data of the current scene captured by the first image capturing unit and the second image data of the current scene captured by the second image capturing unit respectively comprises:
triggering the first image capturing unit to capture the first image data of the current scene, and simultaneously triggering the second image capturing unit to capture the second image data of the current scene; and
acquiring the first image data captured by the first image capturing unit and the second image data captured by the second image capturing unit respectively.

6. The method according to claim 1, wherein the acquiring the first image data of the current scene captured by the first image capturing unit and the second image data of the current scene captured by the second image capturing unit respectively comprises:
triggering the first image capturing unit to capture, at a preset position, the first image data of the current scene;
triggering the second image capturing unit to capture, at the preset position, the second image data of the current scene; and
acquiring the first image data captured by the first image capturing unit and the second image data captured by the second image capturing unit respectively.

7. An electronic device comprising a first image capturing unit and a second image capturing unit, wherein the first image capturing unit and the second image capturing unit utilize different imaging modes during image capturing, and the electronic device further comprising:
an image data acquisition unit, configured to acquire first image data of a current scene captured by the first image capturing unit and second image data of the current scene captured by the second image capturing unit respectively, wherein the first image data comprises first sub-image data and second sub-image data, image dimensions of the first sub-image data and the second sub-image data are different, the second image data comprises third sub-image data, an image dimension of the third sub-image data is the same as the image dimension of the first sub-image data, and an image resolution of the third sub-image data is higher than an image resolution of the first sub-image data; and
an image data synthesizing unit, configured to synthesize the third sub-image data with the first sub-image data of the first image data to obtain the first image data with the first sub-image data having a resolution equal to the resolution of the third sub-image data.

8. The electronic device according to claim 7, wherein the image data synthesizing unit comprises:
a patch library generation sub-unit, configured to generate an image patch library based on the third sub-image data, wherein the image patch library comprises a first image patch and a second image patch corresponding to the first image patch, a resolution of the first image patch is the same as the resolution of the third sub-image data, and a resolution of the second image patch is the same as the resolution of the first sub-image data;
a third patch generation sub-unit, configured to perform interpolation operation and patch decomposition on the first sub-image data to obtain a third image patch of the first sub-image data, wherein each third image patch corresponds to one second image patch, and a resolution of the third image patch is the same as the resolution of the third sub-image data;
a patch determination sub-unit, configured to determine, for each third image patch, a corresponding first image patch in the image patch library; and
a patch substitution sub-unit, configured to substitute, in the first sub-image data of the first image data, the third image patch with the determined corresponding first image patch, to obtain the first image data with the first sub-image data having a resolution equal to the resolution of the third sub-image data.

9. The electronic device according to claim 7, wherein the patch library generation sub-unit comprises:
a first patch decomposition module, configured to decompose the third sub-image data into at least one first image patch by taking each pixel in the third sub-image data as a center; and
a patch downsampling module, configured to perform downsampling on each first image patch to obtain a second image patch corresponding to the first image patch, wherein the resolution of the second image patch is the same as the resolution of the first sub-image data.

10. The electronic device according to claim 8, wherein the third patch generation sub-unit comprises:
an interpolation operation module, configured to perform interpolation operation on the first sub-image data to obtain first sub-image data with a resolution equal to the resolution of the third sub-image data; and
a second patch decomposition module, configured to decompose the first sub-image data obtained after the interpolation operation into at least one third image patch by taking each pixel in the third sub-image data as a center, wherein each third image patch corresponds to one second image patch of the third sub-image data according to relative positions.

11. The electronic device according to claim 7, wherein the first image capturing unit and the second image capturing unit are disposed at adjacent positions;
the image data acquisition unit comprises:
a capturing triggering sub-unit, configured to trigger the first image capturing unit to capture the first image data of the current scene, and simultaneously trigger the second image capturing unit to capture the second image data of the current scene; and
a first acquisition sub-unit, configured to acquire the first image data captured by the first image capturing unit and the second image data captured by the second image capturing unit respectively.

12. The electronic device according to claim 7, wherein the image data acquisition unit comprises:

a first triggering sub-unit, configured to trigger the first image capturing unit to capture, at a preset position, the first image data of the current scene;

a second triggering sub-unit, configured to trigger the second image capturing unit to capture, at the preset position, the second image data of the current scene; and a second acquisition sub-unit, configured to acquire the first image data captured by the first image capturing unit and the second image data captured by the second image capturing unit respectively.

* * * * *